(No Model.) 3 Sheets—Sheet 1.
M. W. JAMIESON.
PULLEY.
No. 564,752. Patented July 28, 1896.
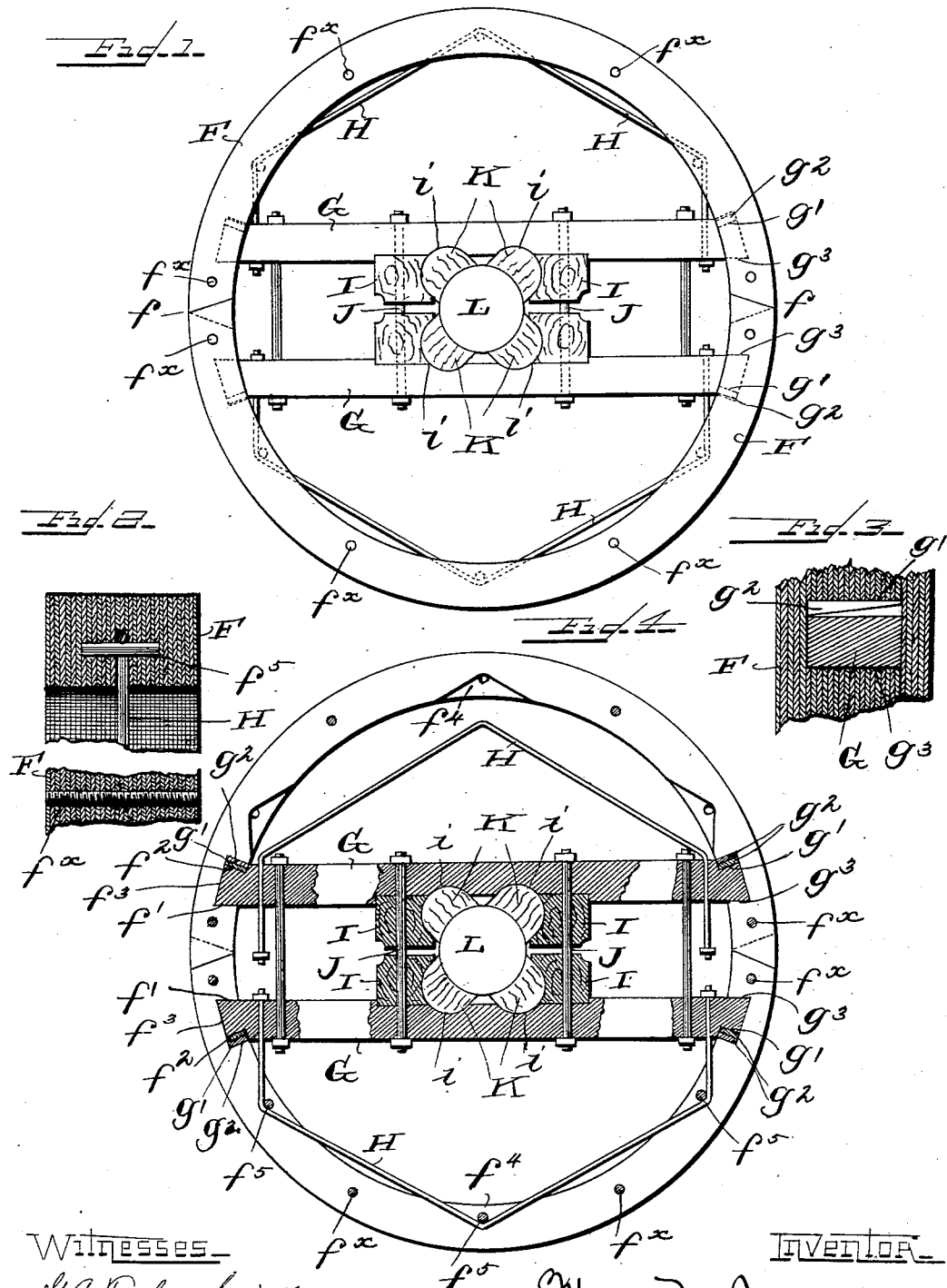
Witnesses
G. A. Vauberschmidt
J. D. Kingsbury
Inventor
Marcus W. Jamieson
By Whitaker & Prevost Attys.

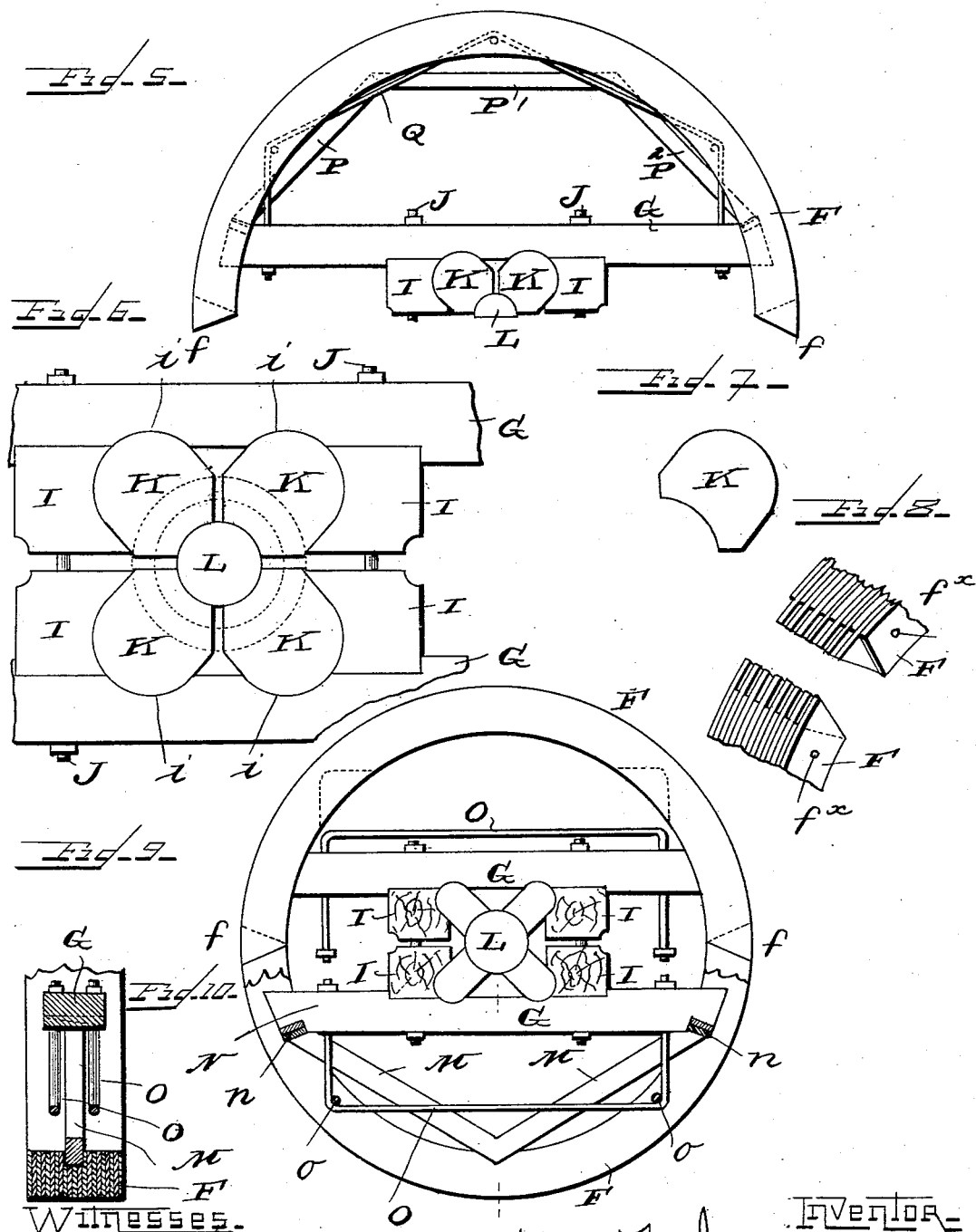

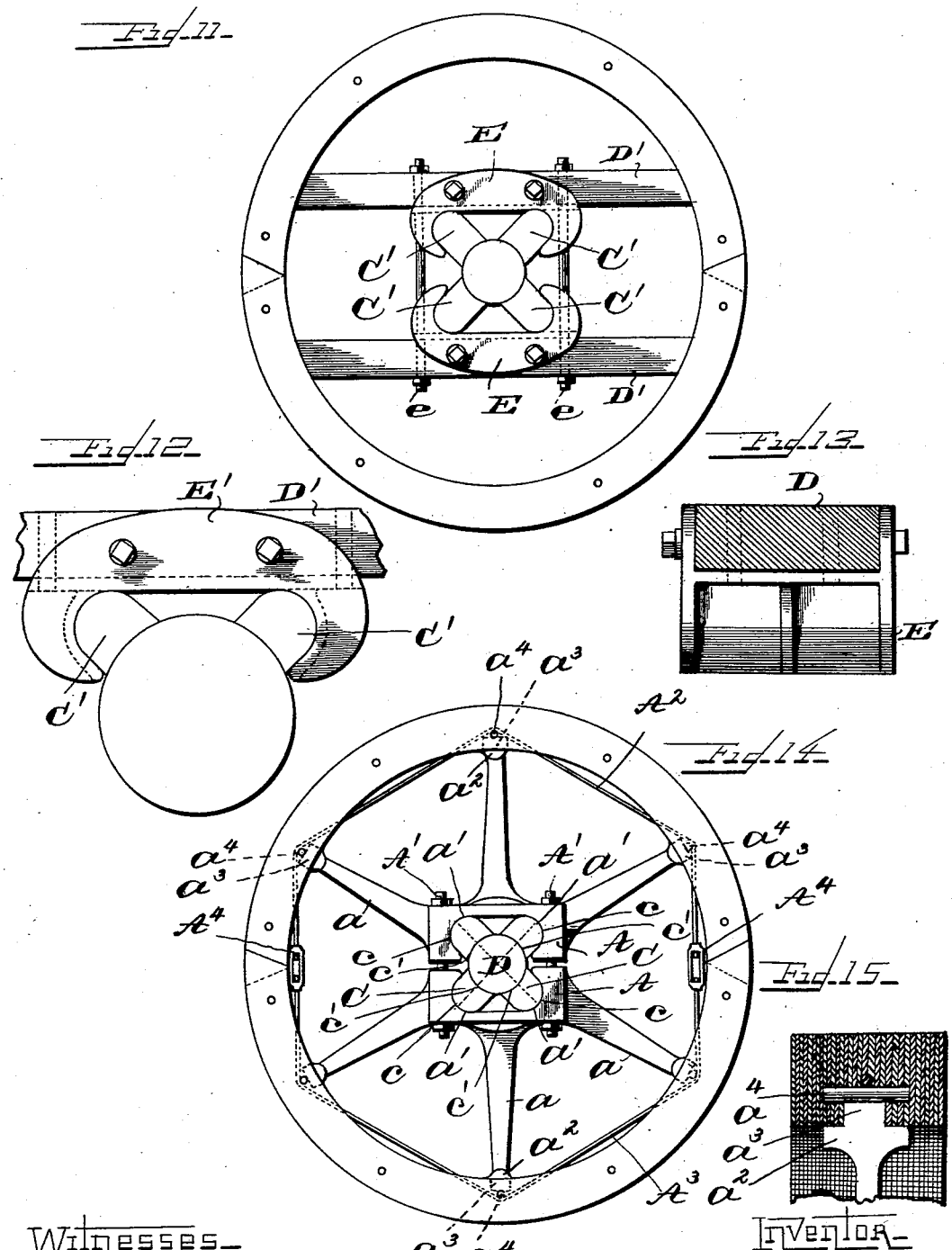

UNITED STATES PATENT OFFICE.

MARCUS W. JAMIESON, OF WARREN, PENNSYLVANIA.

PULLEY.

SPECIFICATION forming part of Letters Patent No. 564,752, dated July 28, 1896.

Application filed November 16, 1895. Serial No. 569,197. (No model.)

*To all whom it may concern:*

Be it known that I, MARCUS W. JAMIESON, a citizen of the United States, residing at Warren, in the county of Warren and State of Pennsylvania, have invented certain new and useful Improvements in Pulleys or Wheels; and I do hereby declare the following to be a full, clear, and exact description of the invention, such as will enable others skilled in the art to which it appertains to make and use the same.

My invention consists in the novel features hereinafter described, reference being had to he accompanying drawings, which illustrate several forms in which I have contemplated embodying my invention, and said invention is fully disclosed in the following description and claims.

Referring to the said drawings, Figure 1 represents a side view of one form of my improved pulley. Figs. 2 and 3 are detail sectional views of portions of the rim of the same, slightly enlarged. Fig. 4 is a sectional view of my improved pulley, showing one of the truss-rods in the position which it occupies when the ends of the cross-bar or spoke is inserted in the rim. Fig. 5 represents a side view of one-half of a pulley embodying a slight modification of my invention. Fig. 6 is an enlarged view of the devices for securing the pulley to its supporting-shaft. Fig. 7 is a detail view of one of the revolubly-mounted gripping-blocks. Fig. 8 is a perspective view of the meeting ends of the rim-sections. Fig. 9 is a view, partly in section, of a pulley having a modified form of devices for attaching the same to its shaft, one-half of the pulley being shown as provided with a slightly-modified form of rim strengthening and supporting devices. Fig. 10 is a detail sectional view of a portion of said pulley. Fig. 11 is a side elevation of a pulley provided with metal castings for supporting the clamping-blocks. Fig. 12 represents an enlarged detail view of one of said castings, showing the gripping-blocks and shaft. Fig. 13 is an enlarged end elevation of one of said castings. Fig. 14 is a side elevation of a pulley having a cast-metal hub and spokes and provided with my improved attaching devices for securing it to its shaft and for supporting and strengthening the rim. Fig. 15 is a detail sectional view of a portion of the rim of the same.

My invention has for its object to provide a construction for attaching pulleys or wheels, whether provided with split or solid rims, to their supporting-shafts; and it also contemplates certain novel features in the construction of such pulleys and wheels which are hereinafter fully set forth.

My improved attaching means comprises among it members a divided hub, which may be formed in any desired way and may be applied to a pulley or wheel having either a split or solid rim. The divided hub is provided with concave curved seats in which are placed gripping-blocks, having curved convex portions engaging the said seats and concave portions for engaging the shaft, said blocks being disposed on opposite sides of the shaft preferably at an angle of about forty-five degrees to the line of division of the hub, and having a hinge engagement with the hub by reason of the concave seats and convex portions of the said gripping-blocks. Clamping devices, preferably bolts and nuts, are provided to draw the parts of the divided hub together and clamp the blocks upon the shaft.

In its simplest form my improved attaching device is illustrated in Fig. 14, which shows a pulley having a metal hub, divided into two sections A A and provided with metal spokes $a$ $a$, to which the rim B, in this instance a split rim, is secured.

The parts of the divided hub are each provided with a pair of concave seats $a'$ $a'$ and to receive the convex edges $c$ of gripping-blocks C, said blocks having concave faces $c'$, which engage the shaft D. The parts of the divided hub are drawn together by clamping-bolts A' A'.

By reference to the dotted lines shown in Fig. 14 it will be seen that the pressure of the blocks C C upon the shaft is transmitted in a line at an oblique angle to the line of division of the hub, force of the clamping devices and also the line of the angle being in this instance substantially forty-five degrees, and it will be seen that the opposite gripping-blocks of the two hub-sections form toggle-joint bars or levers when the clamping-bolts are drawn up and so exert an immense pressure upon the shaft to clamp the same between them and the blocks on the opposite side of the shaft.

It will also be noted that if the arrangement shown in the drawings should prove ineffective the pressure of the blocks can be increased by bringing the seated ends of the pair of blocks forming the toggle-lever nearer toward the dividing-line of the hub structures.

It will also be seen that as the bolts A' A' are tightened and the blocks C C are clamped upon the shaft they will have a slight twisting or hinge motion with respect to their seats in their respective hub-sections, which enables them to act as toggle-levers in the manner just described.

By my construction instead of clamping the shaft in lines parallel to the lines of strain of the clamping devices the pressure of the blocks is exerted upon the shaft substantially in all directions around the shaft, so that it is practically impossible for it to turn.

It will also be noted that by reason of the concave shape of the shaft-engaging portions of the gripping-blocks any tendency of the shaft to turn would increase rather than decrease the pressure of said blocks upon it.

In Figs. 11, 12, and 13 I have shown a split-rim pulley provided with the usual parallel wooden cross-bars or spokes D D, each of which is provided with a metal casting E, secured thereto and provided with curved or concave seats to receive the gripping-blocks C' C', constructed substantially as shown in Fig. 14. The said bars and castings which constitute the divided hub are drawn together by means of suitable clamping-bolts e e.

In Figs. 1, 2, 3, 4, 5, 6, 7, and 8 I have illustrated my preferred form of pulley, which is also provided with my improved attaching device. In these figures F F represent the sections of the divided rim, which are preferably formed or built up of layers of comparatively thin material, as indicated in Figs. 2 and 3. In forming this pulley the central portion of the rim is built up first, and is provided at proper points opposite each other and adjacent to the meeting ends of the rim-sections with dovetailed recesses to receive the dovetailed ends of the cross-bars G G or spokes of the pulley. In cutting these recesses the side $f'$ of each adjacent to the meeting edges of the rim-section is cut parallel to the median line of division of the rim, and the other wall, $f^2$, of the recess is cut substantially radial, as shown in Figs. 1 and 4. The inner wall $f^3$ of the recess is substantially at the same distance from the periphery of the rim at both ends, so that the rim is not weakened as it would be were the recess cut in deeper at one end than the other. The ends of the cross-bars G G are provided with dovetailed portions to conform to the shape of these recesses, except that each dovetailed portion is notched on one side, as indicated at $g'$, to permit the insertion of oppositely-tapered wedges $g^2$, (see Fig. 3,) which are driven in from opposite sides of the pulley and draw the dovetailed portions of the cross-bars into the rim and until the end of said dovetailed portions are forced firmly into contact with the rear walls of the recesses in the rim. It will be noted that the wedges are inserted between the radial side of the recess and the notched portion of the dovetailed portion of the cross-bar and the said dovetailed portion is not notched on the other side, but is provided with a perfectly straight side $g^3$ in line with one edge of said bar, thereby avoiding weakening the dovetailed part, as is done where it is notched on both sides.

After the cross-bars G G are secured in the rims the outer layers of the rim are added on both sides, thus concealing the joints of the cross-bars with the rim. The meeting ends of the rim-sections are provided with interlocking portions, thereby forming a strong joint and preventing lateral movement of the parts with respect to each other. In forming these interlocking portions I provide each end of each rim-section with projecting portions, which enter the recesses between the projecting portions of the opposing rim-section when the parts are brought together. The outer edges of these interlocking projections are inclined and extend from a common line (running transversely of the rim) on one surface of the rim to widely-diverging points on the other surface of the rim. In Figs. 4 and 8 I have shown these inclined edges of said interlocking portions extending from a common line on the inner surface of the rim to widely-diverging points on the periphery of the rim, where they terminate on opposite sides of a median line in the same radial plane as the common line from which they diverge. This construction provides projecting portions which have broad lateral faces to engage the faces of the opposing projecting portions and produces very strong joints. In these figures I have shown every alternate layer projecting to form the interlocking portions, but it is obvious that said projecting portions may include several layers if found desirable. In Fig. 1 I have shown a similar interlocking construction in which the inclined portions extend from a common line on the periphery of the rim, instead of upon the inner surface.

In order to truss or strengthen the rim between the ends of each cross-bar, I provide each of said bars with a truss-rod which is secured in recesses in the rim provided at certain intervals. These recesses $f^4$ are formed in the central portion of the rim before the outer finishing-layers are added, and the truss-rod H is bent so as to fit into the recess in the rim, its ends passing through apertures in the cross-bar G.

The ends of the truss-rod are placed in engagement with the apertures of the cross-bar and pushed through until it occupies the position shown in the upper half of Fig. 4, so as to allow the bent portions of the truss-rod to pass within the rim. After the ends of each cross-bar are wedged in place, as previously described, the ends of the truss-rod are pushed outwardly, so as to bring the bent portions of the said truss into the recesses, where they are secured by transverse pins $f^5$, (see Fig. 2,) which extend only through the central part of the rim. After the outer layers of the rim are built up the pins $f^5$ are of course prevented from getting out of place.

The ends of the truss-rods are provided with nuts by means of which the truss can be tightened as desired to exert the proper strain upon the rim.

After the rim is completed the layers thereof are preferably secured together additionally by means of screw-threaded pins $f^\times$. (See Fig. 2.) These pins are threaded throughout their entire length and are preferably formed in considerable lengths, and then spun into the rim until they pass entirely through, after which they are cut off flush with the surface of the outer layer, so as not to project from the sides of the rim. I prefer to insert these pins in the rim at each side of their meeting edges, as shown in Figs. 1 and 2, and also between the points of connection of the truss-rod with the rim. It will be seen that these threaded pins can never work loose and the threads will positively engage each layer of the pulley, thus binding them firmly together.

Each of the cross-bars G G is provided with two clamping-blocks I I, formed, preferably, of wood with the grain running transversely of the cross-bar, and which are preferably let into recesses on the inner side of said cross-bar, and provided with apertures for the passage of the clamping-bolts J J. The concave seats $i\ i$ for the gripping-blocks are formed partly in the cross-bars and partly in said clamping-blocks, as shown.

K K represent the gripping-blocks, having convex portions for engaging the seats $i\ i$ and concave portions engaging the shaft L. It is obvious that by providing each pulley with blocks of graduated length the pulley may be attached to shafts of different sizes. In Fig. 6 I have shown in full lines a set of gripping-blocks which are adapted for use with a shaft of small diameter, and indicating in dotted lines shafts of larger diameter and the shape of other sets of blocks which would be used with the same. Fig. 7 is an end view of one of the gripping-blocks detached. By employing these sets of gripping-blocks the pulley or wheel can be secured to shafts of different diameter without changing the construction of the hub in any way. The gripping-blocks I prefer to form of wood with the grain extending radially with respect to the shaft, though in ordinary and small sizes the grain may run parallel to the shaft, but they may be formed of metal or other suitable material if found desirable.

In pulleys or wheels of very large diameters I may prefer to provide the rims with suitable braces against which the strain of the truss-rods will be exerted. In the lower half of Fig. 9 I have shown one means of bracing the rim, in which I employ a pair of braces M M, extending from the ends of the cross-bar N to a point midway between the same on the rim. The meeting ends of the braces M M are let into recesses in the central portion of the rim, and their opposite ends engage the wedges $n\ n$ for securing the dovetailed ends of the cross-bar in place. As the wedges are driven in they will exert pressure both on the dovetailed part of the cross-bar and upon the end of the brace M, thus tightening both of said parts and holding them in position. The truss-rod O will be so formed that the pins $o$, which secure it to the rim, will alternate with the points of engagement of the brace-rods with the rim, as shown, and I prefer to provide a truss-rod on each side of the braces, as shown in Fig. 10, to equalize the strain upon the rim. It will be seen that in this construction the truss-rods exert an inward strain upon the rim at its weakest point against the resistance of the braces, thus forming a very strong and durable wheel or pulley.

In Fig. 5 I have shown another modification of my pulley in which three braces P, P', and $P^2$ are employed for each rim-section, arranged as chords of the circle of the pulley-rim. In this construction the braces P and $P^2$ have their ends bearing against the wedges for securing the ends of the cross-bar in place and the meeting ends of the braces engage recesses in the rim, as described in reference to Fig. 9. The truss-rod Q is also arranged so that the retaining-pins in the rim alternate with the points of engagement of the braces with the rims.

In both the forms of pulley last described my improved attaching device previously described is shown and will be employed.

In Figs. 14 and 15 I have illustrated another slightly-modified construction for strengthening and supporting the rim. The pulley shown in these figures, as previously described, is provided with a cast-metal hub and spokes. These spokes are preferably provided near their ends with laterally-extending shoulders $a^2$, for engaging the inner surface of the rim, and a tenon $a^3$, which enters a recess in the rim. Transverse pins $a^4$ are inserted in the central layers of the rim, (see Fig. 15,) which pins engage and support the ends of the tenons $a^3$.

$A^2\ A^3$ indicate the truss-rods, each of which extends half-way around the pulley, engaging the pins $a^4$, the meeting ends of said truss-rods being connected adjustably by means of turnbuckles $A^4$ or other suitable devices, which put the proper tension upon the truss-rods.

It will be noted that the truss-rods exert their strain upon the pins $a^4$, which in turn transmit the pressure to the ends of the spokes, which give a solid resistance against which the truss-rods draw, thus binding the rim to the spokes and securing a very strong wheel or pulley which is very desirable for certain classes of work.

What I claim, and desire to secure by Letters Patent, is—

1. Means for securing a wheel or pulley to its supporting-shaft comprising a divided-hub structure, shaft-engaging gripping-blocks seated in said divided hub, said blocks being movable in said seats as in bearings, and devices for clamping said blocks upon the shaft, substantially as described.

2. Means for securing a wheel or pulley to its supporting-shaft comprising a divided-hub structure, shaft-engaging gripping-blocks seated in said divided hub, means for clamping the divided hub and blocks upon the shaft, the said blocks being movable in said seats as in a bearing and being inclined to the line of force of the clamping means, substantially as described.

3. Means for securing a wheel or pulley to its supporting-shaft comprising a divided-hub structure, provided with curved seats, shaft-engaging gripping-blocks engaging said curved seats and being oppositely provided with shaft-engaging surfaces, said blocks being movable in said seats as in bearings and means for clamping said hub and blocks upon the shaft, substantially as described.

4. Means for securing a wheel or pulley to its supporting-shaft comprising the divided-hub structure, provided with concave seats, gripping-blocks each having convex portions working in said seats and forming a hinge connection therewith, said blocks having concave portions engaging said shaft, and clamping devices engaging said divided hub, substantially as described.

5. A wheel or pulley provided with a truss-rod, secured to the rim at intervals and adjusting devices for said truss-rod, substantially as described.

6. A wheel or pulley having its rim provided with transversely-extending pins, at intervals, and a truss-rod having portions intermediate its ends engaging said pins, and adjusting devices for said truss-rod, substantially as described.

7. A wheel or pulley having a split rim, each rim-section being provided with a cross-bar, and a truss-rod having portions intermediate its ends secured to said rim at intervals between the ends of each cross-bar and having its ends adjustably secured to said cross-bar, substantially as described.

8. A wheel or pulley having a split rim, each rim-section being provided with a cross-bar and having recesses at intervals between the ends of said cross-bar, a truss-rod having angular portions intermediate its ends engaging said recesses, and its ends secured adjustably to said cross-bar and pins extending transversely through said rim and recesses and engaging said truss-rod, substantially as described.

9. A wheel or pulley having a split rim, each end of each rim-section being provided with interlocking projecting portions having their outer edges extending from a common line on one surface of the rim to widely-diverging points on the other surface, substantially as described.

10. A wheel or pulley having a split rim each rim-section being provided with a cross-bar, a series of braces extending from one end of said cross-bar to the other and engaging the rim intermediate the ends of said cross-bar and a truss-rod having its ends adjustably secured to said cross-bar, and secured to the rim intermediate the points of engagement of said braces therewith, substantially as described.

11. A wheel or pulley having a split rim, each rim-section being provided with a cross-bar having dovetailed portions engaging recesses in said rim, braces extending from one end of said cross-bar to the other, and engaging the rim intermediate the ends of said cross-bar and wedges interposed between the ends of said braces and said dovetailed portions whereby said wedges exert pressure upon both the dovetailed portions and said braces, substantially as described.

12. A wheel or pulley having a split rim, a cross-bar connecting the ends of each rim-section, a truss-rod having its ends adjustably secured to said cross-bar and having intermediate parts lying in recesses in said rim-section, pins for engaging said truss-rod extending transversely through the central portion of the rim and covering-layers, concealing said pins and preventing their accidental displacement, substantially as described.

13. In a pulley provided with a split rim and cross-bars connecting the ends of each rim, sectional clamping-blocks secured to said cross-bars, curved seats formed in said clamping-blocks and cross-bars, a series of gripping-blocks having convex portions engaging said seats and opposite concave portions for engaging the pulley-supporting shaft, and clamping-bolts passing through said cross-bars and clamping-blocks, said gripping-blocks exerting pressure upon said shaft in lines at an angle to said clamping-bolts substantially as described.

In testimony whereof I affix my signature in presence of two witnesses.

MARCUS W. JAMIESON.

Witnesses:
L. P. WHITAKER,
J. D. KINGSBERY.